United States Patent Office 3,813,407
Patented May 28, 1974

3,813,407
PROCESS FOR THE PREPARATION OF 1-HY-
DROXY - 2 - (1,1-DIFLUOROALKYL)BENZ-
IMIDAZOLES AND 1-HYDROXY-2-(1,1-DI-
FLUOROALKYL) - 1H - IMIDAZO(4,5-b)PYRI-
DINES
George O. P. Doherty, Greenfield, Ind., assignor to Eli
Lilly and Company, Indianapolis, Ind.
No Drawing. Filed Mar. 19, 1970, Ser. No. 21,226
Int. Cl. C07d 49/38
U.S. Cl. 260—296 B                              10 Claims

ABSTRACT OF THE DISCLOSURE

The present invention is directed to a process for the preparation of 1-hydroxy-2-(1,1-difluoroalkyl)benzimidazoles and 1-hydroxy-2-(1,1-difluoroalkyl)-1H-imidazo(4,5-b)pyridines. The process involves the reduction of, respectively, corresponding 2-nitro-1-(2,2-difluoroalkanamido)benzenes and 3-nitro-2-(2,2-difluoroalkanamido)pyridines, to intermediates which undergo a spontaneous cyclodehydration to yield the ultimate products. The reduction is achieved in good yield by the use, as reducing agent, of hydrogen in the presence of a catalyst, or tin, zinc, or iron in acid or neutral solution. All of the products are useful as herbicides.

CROSS-REFERENCE TO RELATED APPLICATIONS

The products of the present process are also novel. Essentially all of the products are claimed in two other patent applications; compounds of Formula I are disclosed and claimed in application Ser. No. 21,227, filed Mar. 19, 1970, and compounds of Formula II are disclosed and claimed in application Ser. No. 21,535, filed Mar. 20, 1970.

SUMMARY OF THE INVENTION

The present invention provides a synthetic route for the production of 1-hydroxy-2-(1,1-difluoroalkyl)benzimidazoles and 1-hydroxy-2-(1,1-difluoroalkyl)-1H-imidazo(4,5-b)pyridines.

Accordingly, the present invention is directed to a process for the production of compounds of the formulae:

I. 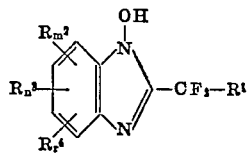

II. 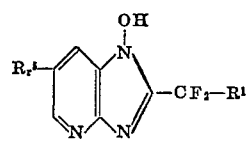

which comprises subjecting precursor compounds of the formulae:

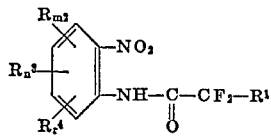

and

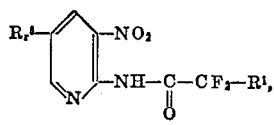

respectively, to reduction to conjectured intermediates. These intermediates readily undergo cyclodehydration, yielding the desired product compounds, which are useful as herbicides. The reduction is achieved in good yield by the use, as reducing agent, of hydrogen in the presence of a catalyst, or tin, zinc, or iron in acid or neutral solution.

In the above and succeeding formulae throughout the present specification and claims, symbols are employed with the following meanings:

$R^1$ represents hydrogen, chloro, fluoro, perfluoroalkyl of $C_1$–$C_6$, or radical of the formula

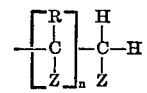

wherein each Z independently represents hydrogen or halo and $n$ represents 0 or 1;
each $R^2$ independently represents halo;
each $R^3$ independently represents nitro, —$CF_3$, —$CF_2Cl$, or —$CF_2H$;
$R^4$ represents cyano or loweralkylsulfonyl of $C_1$–$C_4$;
$R^5$ represents halo, nitro, —$CF_3$, —$CF_2Cl$, —$CF_2H$, or loweralkylsulfonyl of $C_1$–$C_4$;
$m$ represents an integer of from 0 to 4, both inclusive;
$n$ represents an integer of from 0 to 2, both inclusive;
each $r$ independently represents 0 or 1;
and the sum of $m$, $n$ and $r$ is an integer of from 0 to 4, both inclusive.

DETAILED DESCRIPTION OF THE INVENTION

While the precise mechanism of the present process is not completely understood, it is presently thought that it proceeds as a multi-step process which can be outlined by the following reaction scheme, generalized to designate both benzimidazole and imidazo(4,5-b)pyridine production:

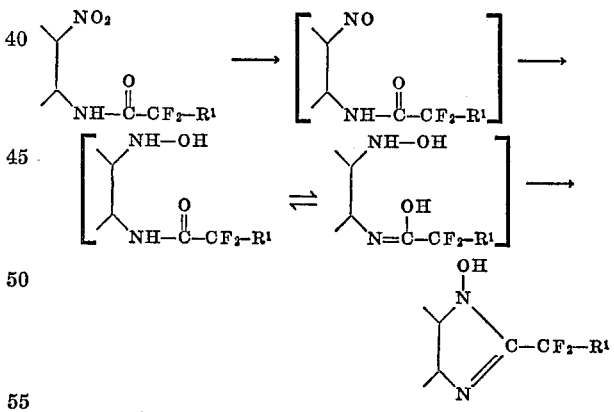

To date, it has not been possible to separate the conjectured intermediates; however, as will be apparent to those skilled in the prior art, the intermediates, if isolatable, could be subsequently subjected to conditions to cause further reduction and cyclodehydration.

While the exact mechanism is not known, the present process goes forward under a wide variety of reaction conditions, and when employing any of a wide variety of reducing agents. However, it has been found that certain of the reducing agents give superior results, in particular, higher yields and diminution of side products. These agents are hydrogen in the presence of a catalyst, or tin, zinc, or iron, in form to undergo a valency change, in acid or neutral solution. A basic solution favors production of by-products and is to be avoided.

In the case of hydrogen in the presence of a catalyst, the catalyst can be a noble metal, Raney nickel, or Raney copper. The term "noble metal" is used to refer to platinum, palladium, ruthenium, rhodium, iridium, and osmium. In general, a noble metal is preferred, and, of the noble metals, palladium or platinum. The catalyst can be employed alone, or especially in the instance of palladium, can be supported on a carrier such as carbon or an alkali metal salt. While only the noble metal itself exhibits catalytic effect, the metal can be supplied as, for example, a chloride or oxide and the metal regenerated in situ by hydrogenation.

Thus, in accordance with this embodiment of the present invention, each of the following can be employed as reducing agent:

hydrogen and platinum
hydrogen and platinum supplied initially as platinum oxide
hydrogen and platinum supplied initially as platinum chloride
hydrogen and palladium
hydrogen and ruthenium
hydrogen and rhodium
hydrogen and osmium
hydrogen and iridium
hydrogen and palladium on carbon
hydrogen and palladium on barium sulfate
hydrogen and palladium on calcium sulfate
hydrogen and Raney nickel
hydrogen and Raney copper The reaction is further aided by the presence of a small amount of an acid, such as, for example, a mineral acid such as hydrochloric acid, a Lewis acid, or a compatible organic acid such as trifluoroacetic acid. As will be understood by those skilled in the art, the use of an acid which would attack a substituent ($R^2$, $R^3$, $R^4$, $R^5$) or would replace the acyl

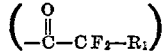

group should be avoided. Otherwise, the identity of the acid is not important. The use of such an acid is preferred generally in the practice of the present invention. Its use may be essential to the obtaining of good yields in compounds of Formula I where the sum of $m$, $n$, and $r$ is 0, and in all compounds of Formula II, but especially those wherein $r$ is 0.

The amounts of reactants employed are not critical. In general, preferred amounts are 2 moles of hydrogen per mole of the precursor compound, and a catalytic amount of catalyst, such as from 1 to 10 grams or more per kilogram of the precursor compound. In the instance of Raney copper or Raney nickel, larger amounts, such as from 10 to 1000 grams per kilogram of precursor compound, are preferred. The amount of the acid catalyst, if employed, is likewise not critical; if employed, the acid should be used in at least a small catalytic amount. However, in those instances above set forth where the presence of acid is important for the obtaining of good yields, larger amounts, such as amounts equimolar with the precursor compound, are preferred, or an acid can even be used in amount to serve as solvent. Temperatures of from 0° to 200° C. are operative, but better results are typically achieved at temperatures of from 10° to 25° C. with palladium or platinum as catalyst; where the catalyst is other than palladium or platinum, higher temperatures and more severe conditions generally are preferred. Conveniently, a Parr or other pressure apparatus is used to contain the reaction mixture during hydrogenation, when conducted at superatmospheric pressure; however, the reaction also goes foward at atmospheric or only slightly superatmospheric pressure in the case of palladium or platinum. In the case of the other catalysts, superatmospheric pressure of from 1 to 200 atmospheres may be preferred. The solvent used in the reaction is preferably an organic solvent. Ethyl acetate, the lower alkanols and ethers such as diethyl ether and tetrahydrofuran have been found to be suitable.

When hydrogen uptake is complete, the product is separated from the reaction mixture in conventional procedures. Most typically, the reaction mixture is filtered to remove remaining catalyst, and the filtrate evaporated to separate the product as a residue. This product residue can be purified, also in conventional procedures, typically recrystallization or extraction into sodium bicarbonate solution followed by precipitation with mineral acid.

In the case of iron, tin, or zinc in acid or neutral solution as reducing agent, the identity of particular substances employed is not critical, except that the metal must be capable of undergoing a valency change. The metal component can be supplied as the metal or, in the instance of iron and tin, as a divalent salt thereof. Thus, iron, tin, or zinc can be supplied as the metal in combination with an acid, typically hydrochloric acid; however, other acids such as, for example, acetic acid, can be employed. Also, divalent iron or tin can be supplied in the form of a salt also in combination with an acid, for example, stannous chloride in hydrochloric acid. Other salts such as ferrous chloride, ferrous sulfate, stannous sulfate, ferrous oxalate, and the like can be used. As will be evident to those skilled in the art, all that is critical is the presence of one of the specified metals in a condition to undergo a valency change and in an acid or neutral solution.

Thus, in accordance with this embodiment of the present invention, each of the following can be employed as reducing agent:

zinc and hydrochloric acid
tin and hydrochloric acid
iron and hydrochloric acid
stannous chloride and hydrochloric acid
ferrous chloride and hydrochloric acid
ferrous sulfate and sulfuric acid
zinc and acetic acid
zinc and ammonium chloride In carrying out the present process with this category of reducing agent, the precursor material is mixed with the metal (or salt) in a liquid reaction medium such as those described hereinabove for the hydrogenation reaction, and the acid or additional salt added. It is preferred to employ the reducing agent in an amount representing at least the theoretical, which is such amount as will produce two mole equivalents of hydrogen. The reaction goes forward over a wide range of temperatures, such as from 0 to 150° C., but it is preferably carried out at temperatures of from 10 to 25° C., and at atmospheric pressures. Separation and if desired, purification, are carried out in standard procedures.

The following examples illustrate the present invention and will enable those skilled in the art to practice the same.

Example 1.—Preparation of 1-hydroxy-5,6-dichloro-2-(trifluoromethyl)benzimidazole 4,5-dichloro - N - (trifluoroacetylacetyl)-2-nitroaniline (14.0 grams), 100 milliliters of ethanol, and 1.0 gram of 5 percent palladium on carbon were mixed with one another. The resulting mixture was hydrogenated in a Parr bomb until 2 mole equivalents of hydrogen had been taken up (about twenty minutes). Solvent was then evaporated. The residue was dissolved in a small amount of ethanol and the resulting solution poured into 400 milliliters of 2 percent sodium bicarbonate, stirred for one hour, filtered, acidified to pH of about 7, filtered, acidified to pH of 2, and filtered again to obtain 10 grams of 1-hydroxy-5,6-dichloro-2-(trifluoromethyl)benzimidazole, M.P., 186° C. (dec.) (yield, about 80 percent).

*Analysis.*—Calcd.: C, 35.45; H, 1.11; N, 10.34. Found: C, 35.44; H, 1.24; N, 10.56.

Example 2.—Preparation of 1-hydroxy-6-(methylsulfonyl)-2-(trifluoromethyl)benzimidazole A mixture of N-(trifluoroacetyl)-4-(methylsulfonyl)-2-nitroaniline (2.84 grams) and 200 milligrams of 5 percent palladium on calcium carbonate in 100 milliliters of 60/40 ethanol/ethyl acetate was hydrogenated in a Parr bomb until 2 moles of hydrogen had been taken up (five minutes). The reaction mixture was then filtered and evaporated, the residual solid material being taken up in 20 milliliters of methanol and 150 milliliters of ether. An orange solid not soluble in the methanol was filtered off. The ethereal solution was washed with two 50-milliliter portions of water and three 10-milliliter portions of 10 percent sodium carbonate solution. The aqueous solution was then acidified to pH 2 and the solid which precipitated, the desired 1-hydroxy-6-(methylsulfonyl) - 2 - trifluoromethyl)benzimidazole product, separated by filtration and air dried at room temperature. After recrystallization from acetone, the product melted at 205° C. (dec.). The yield was about 63 percent.

Example 3.—Preparation of 1-hydroxy-4-nitro-2,6-bis(trifluoromethyl)benzimidazole A mixture of N-(trifluoroacetyl)-2,6-dinitro-4-(trifluoromethyl)aniline (1.75 grams) and 100 milligrams of 5 percent palladium on calcium carbonate in 100 milliliters of ethyl acetate was hydrogenated in a Parr bomb until $\frac{3}{100}$ mole of hydrogen had been taken up. The reaction mixture was then filtered and evaporated to dryness, and the residue taken up in about 300 milliliters of ether and extracted with 5 percent sodium carbonate. The aqueous solution was acidified, the resulting solid separated by filtration and taken up in either, and the solution dried and evaporated. As a result of these operations, the desired 1-hydroxy-4-nitro-2,6-bis(trifluoromethyl)benzimidazole product was obtained; after recrystallization from chloroform, it melted at 202–04° C., yield about 57 percent.

*Analysis.*—Calcd. C, 34.30; H, 0.96; N, 13.35. Found: C, 34.47; H, 1.08; N, 13.25.

Example 4.—Preparation of 1-hydroxy-2-(trifluoromethyl)benzimidazole

A mixture of N-(trifluoroacetyl)-2-nitroaniline (1.17 grams) and 5 percent palladium on barium sulfate (150 milligrams) in 100 milliliters of ethyl acetate was hydrogenated in a Parr bomb until there had been a 2 mole equivalent uptake of hydrogen. The resulting mixture was analyzed by TLC and shown to consist of three components, one of which was identified as the desired 1-hydroxy-2-(trifluoromethyl)benzimidazole.

Example 5.—Preparation of 1-hydroxy-2-(trifluoromethyl)benzimidazole

N-(trifluoroacetyl) - 2 - nitroaniline (1.17 grams) was hydrogenated as reported in Example 4 except that there was used as catalyst 60 milligrams of platinum oxide, and that only 80 milliliters of solvent was used. There was likewise obtained a mixture of the three designated compounds, including 1-hydroxy-2-trifluoromethyl)benzimidazole.

Example 6.—Preparation of 1-hydroxy-2,6-bis-(trifluoromethyl)-1H-imidazo(4,5-b)pyridine A mixture of 5-(trifluoromethyl)-3-nitro-2-aminopyridine (10 grams) in 10 milliliters of trifluoroacetic anhydride and 20 milliliters of pyridine was heated on a steam bath for two hours. The solvents were then removed by evaporation on a rotary evaporator at 100° C. for one hour. The residue was taken up in ethyl acetate and hydrogenated in a Parr apparatus over 2 grams of 5 percent paladium on carbon. The reaction mixture was filtered, evaporated, and taken up in ether. The ethereal solution was washed with 10 percent hydrochloric acid, dried over magnesium sulfate and filtered through charcoal, and evaporated, leaving as a residue the desired 1-hydroxy-2,6 - bis(trifluoromethyl) - 1H - imidazo(4,5-b)pyridine product. It was crystallized from acetone, M.P. 239–40° C., yield about 50 percent.

*Analysis.*—Calcd. C, 35.44; H, 1.15; N, 15.50; F, 42.05. Found: C, 35.40; H, 1.43; N, 15.28; F, 42.32.

Examples 7–10.—Preparation of 1-hydroxy-2,6-bis(trifluoromethyl)-1H-imidazo(4,5-b)pyridine Several preparations of 1-hydroxy - 2,6 - bis(trifluoromethyl)-1H-imidazo(4,5-b)pyridine were conducted utilizing uniform reaction conditions but for the identity of the catalyst. Accordingly, there was first prepared a stock solution of 2.67 grams of 5-(trifluoromethyl)-3-nitro-2-(trifluoroacetamido)pyridine and 100 milliliters of ethyl acetate. A twenty-milliliter aliquot of this stick solution was utilized for each of the several reactions. Each reaction was conducted by hydrogenating the respective aliquot with a specified catalyst in a Parr shaker until hydrogen uptake was completed, generally about 30 minutes or, in the instance of certain of the catalysts, less than 30 minutes. Each reaction mixture was then filtered, diluted with 30 milliliters of ethyl acetate, and extracted with three 10-milliliter portions of 10 percent sodium bicarbonate solution. The aqueous solution was acidified, resulting in each instance to precipitation of the desired 1-hydroxy-2,6-bis(trifluoromethyl) - 1H - imidazo(4,5-b)pyridine. Each product was separated by filtration, and extracted with ethyl acetate. The substances evaluated as catalyst, and the respective yields of the desired product, were as follows:

| Catalyst | Yield of product percent |
|---|---|
| Example: | |
| 7 — 5 percent palladium on carbon | >75 |
| 8 — Platinum | ~50 |
| 9 — Raney nickel | 20 |
| 10 — 5 percent of rhodium on carbon | ~40 |

In all of the foregoing examples, confirmation of the product was made by infrared spectra.

Example 11.—Preparation of 1-hydroxy-6-chloro-2-(trifluoromethyl)-1H-imidazo(4,5-b)pyridine 5-chloro - 3 - nitro-2-(trifluoroacetamido)pyridine (2.7 grams), anhydrous stannous chloride (3.8 grams), and 4.0 milliliters of concentrated hydrochloric acid were mixed in 20 milliliters of acetic acid. The mixture was cooled to temperatures of 0–10° C. and maintained thereat for 15 minutes. Water (50 milliliters) was then added to the reaction, which resulted in the precipitation in the reaction mixture of the desired 1-hydroxy-6-chloro-2-(trifluoromethyl)-1H-imidazo(4,5-b)pyridine product. It was separated and dried. The yield was 1.3 grams, 55 percent. The product so obtained melted at 207° C. (dec.).

Example 12.—1-hydroxy-6-chloro-2-(chlorodifluoromethyl)-1H-imidazo(4,5-b)pyridine 5-chloro - 3 - nitro-2-(chlorodifluoroacetamido)pyridine (2.70 grams), 100 milliliters of ethanol, 1 milliliter of concentrated hydrochloric acid, and 0.5 gram of 5 percent palladium on carbon were mixed and hydrogenated on a Parr apparatus until two-mole equivalents had been taken up. The mixture was then filtered and ethanol evaporated under vacuum, leaving the 1-hydroxy-6-chloro-2-(chlorodifluoromethyl)-1H-imidazo(4,5-b)pyridine product. It was recrystallized from benzene/acetone in a yield of 2.3 grams (96 percent); the product decomposes at 210° C. and is melted with complete decomposition at 220° C.

*Analysis.*—Calcd.: C, 33.10; H, 1.19; N, 16.54. Found: C, 33.10; H, 1.33; N, 16.80.

Example 13.—1-hydroxy-2-(trifluoromethyl)-
1H-imidazo(4,5-b)pyridine 3-nitro-2-(trifluoroacetamido)pyridine (2.0 grams) was mixed with 100 milliliters of ethanol and 2 milliliters of concentrated hydrochloric acid. The mixture was hydrogenated over 0.3 gram of 5 percent of palladium on carbon for ten minutes, then filtered and solvent evaporated. The residue was taken up in a sodium carbonate solution, and the pH of the solution was adjusted to 6.5 with acetic acid. The solution was then filtered, and the filtrate acidified to pH 2 with hydrochloric acid and filtered to separate the desired 1-hydroxy-2-(trifluoromethyl)-1H-imidazo(4,5-b)pyridine, M.P. 261–62° C. The yield was about 1.0 gram, representing about 60 percent.

*Analysis.*—Calcd. C, 41.39; H, 1.98; N, 20.70. Found: C, 41.59; H, 2.03; N, 20.69.

Other products which are readily prepared in good yield by the process of the present invention include the following:

1-hydroxy-6-(methylsulfonyl)-2-(trifluoromethyl)-1H-imidazo(4,5-b)pyridine, M.P. 265—68° C.
1-hydroxy-6-nitro-2-(difluoromethyl)-1H-imidazo(4,5-b)pyridine
1-hydroxy-2,6-bis(difluorochloromethyl)-1H-imidazo(4,5-b)pyridine
1-hydroxy-2-(trifluoromethyl)benzimidazole, M.P. 198–99° C.
1-hydroxy-6-chloro-2-(perfluoro-n-heptyl)-1H-imidazo(4,5-b)pyridine
1-hydroxy-6-chloro-2-(1,1-difluoroethyl)-1H-imidazo(4,5-b)pyridine
1-hydroxy-6-chloro-2-(trifluoromethyl)benzimidazole, M.P. 207° C.
1-hydroxy-4,6,7-trichloro-2-(difluorochloromethyl)benzimidazole
1-hydroxy-2,6-bis(difluoromethyl)benzimidazole
1-hydroxy-6-(difluorochloromethyl)-2-(perfluoro-n-hexyl)benzimidazole
1-hydroxy-6-cyano-2-(1,1-difluoro-n-propyl)benzimidazole
1-hydroxy-6-cyano-4-nitro-2-(trifluoromethyl)benzimidazole
1-hydroxy-6-bromo-2-(trifluoromethyl)benzimidazole, M.P. 256–58° C., with decomposition
1-hydroxy-6-chloro-2-(pentafluoroethyl)-1H-imidazo(4,5-b)pyridine, M.P. 240° C.

The product produced by the present invention are useful as herbicides. Products of Formula I are active at rates of from 0.25 to 20 pounds or more per acre; products of Formula II are active at rates of from 0.01 to 20 pounds or more per acre. The compounds can be used alone but are preferably incorporated in a formulation comprising, in addition to the compound or compounds, one or more adjuvants such as a surface active agent for a liquid formulation, or an inert finely divided solid for a dust. In addition to exhibiting herbicidal activity, the products are of relatively low mammalian toxicity.

The precursor compounds to be employed in the process of the present invention are novel and are also claimed in the same copending applications, earlier identified, wherein the corresponding products are claimed. In general, the precursor compounds are prepared by acylation of the corresponding amino compounds.

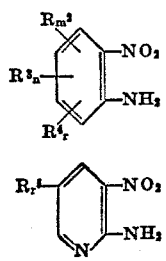

with an anhydride or acyl halide. These amino compounds are themselves generally known; a method for preparing the following compounds:

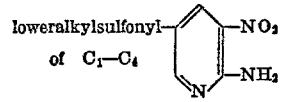

and

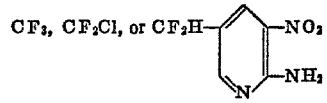

is taught in the copending application on products of Formula II.

While the foregoing invention has been defined in terms of certain benzimidazole and 1H-imidazo(4,5-b)-pyridine products, the process is equally operative for the production of benzimidazole and 1H - imidazo(4,5-b)pyridine products bearing other types of substituents, and also, in the instance of the 1H-imidazo(4,5-b)-pyridines, one or more substituents at other positions instead of or in addition to the R⁵ substituent.

I claim:
1. The process for the production of compounds of the formulae:

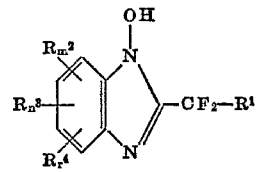

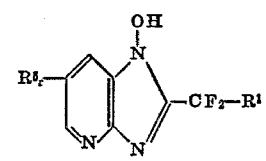

which comprises subjecting to a reducing agent selected from the group consisting of (1) hydrogen in the presence of a catalyst; and (2) tin, zinc, or iron in acid or neutral solution, corresponding precursor compounds of the formulae:

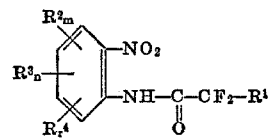

and

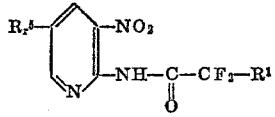

respectively, wherein $R^1$ represents hydrogen, chloro, fluoro, perfluoroalkyl of $C_1$–$C_6$, or radical of the formula

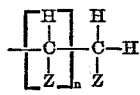

wherein each Z independently represents hydrogen or halo and n represents 0 or 1;
each $R^2$ independently represents halo;
each $R^3$ independently represents nitro, —$CF_3$, —$CF_2Cl$, or —$CF_2H$;
$R^4$ represents cyano or loweralkylsulfonyl of $C_1$–$C_4$;
$R^5$ represents halo, nitro, —$CF_3$, —$CF_2Cl$, —$CF_2H$, or loweralkylsulfonyl of $C_1$–$C_4$;
m represents an integer of from 0 to 4, both inclusive;

$n$ represents an integer of from 0 to 2, both inclusive; each $r$ independently represents 0 or 1; and the sum of $m$, $n$, and $r$ is an integer of from 0 to 4, both inclusive.

2. The process of claim 1 wherein the reducing agent is hydrogen in the presence of a catalyst.

3. The process of claim 2 wherein the precursor compound is 5-chloro-3-nitro-2-(trifluoroacetamido)-pyridine.

4. The process of claim 2 wherein the precursor compound is 2,6 - dinitro-4-(trifluoromethyl)-N-(trifluoroacetyl)aniline.

5. The process of claim 2 wherein the catalyst is palladium or platinum.

6. The process of claim 1 wherein the reducing agent is iron, tin, or zinc in acid or neutral solution.

7. The process of claim 6 wherein the precursor compound is 5-chloro-3-nitro-2-(trifluoroacetamido)pyridine.

8. The process of claim 6 wherein the precursor compound is 2,6 - dinitro-4-(trifluoromethyl)-N-(trifluoroacetyl)aniline.

9. The process of claim 6 wherein the reducing agent comprises stannous chloride and hydrochloric acid.

10. The process of claim 6 wherein the reducing agent comprises ferrous chloride and hydrochloric acid.

References Cited

UNITED STATES PATENTS

| | | | |
|---|---|---|---|
| 3,681,376 | 8/1972 | Scherer et al. | 260—309.2 |
| 3,398,157 | 8/1968 | Chemerda et al. | 260—302 |
| 3,415,839 | 12/1968 | Schulenberg | 260—309.2 |
| 3,429,890 | 2/1969 | Sletzinger et al. | 260—302 |
| 3,516,999 | 6/1970 | Kano et al. | 260—247.5 |

OTHER REFERENCES

Morrison et al., "Organic Chemistry," 2nd ed., Allyn and Bacon, Inc., Boston (1966), p. 730.

JOHN D. RANDOLPH, Primary Examiner

G. T. TODD, Assistant Examiner

U.S. Cl. X.R.

260—294.8 C, 294.9, 295 AM, 309.2, 562 B, 999